United States Patent
Hong et al.

(10) Patent No.: US 8,442,603 B2
(45) Date of Patent: May 14, 2013

(54) METHOD OF MANUFACTURING CASE FOR MOBILE COMMUNICATIONS TERMINAL, CASE FOR MOBILE COMMUNICATIONS TERMINAL, AND MOBILE COMMUNICATIONS TERMINAL HAVING THE SAME

(75) Inventors: Ha Ryong Hong, Gyunggi-do (KR); Jae Gyu Go, Gyunggi-do (KR); Jae Suk Sung, Gyunggi-do (KR); Dae Kyu Lee, Gyunggi-do (KR); Chang Mok Han, Chungcheongnam-do (KR); Dae Ki Lim, Gyunggi-do (KR); Chan Gwang An, Gyunggi-do (KR); Ki Won Chang, Gyunggi-do (KR); Sung Eun Cho, Gyunggi-do (KR)

(73) Assignee: Samsung Electro-Mechanics Co., Ltd., Korea (KR)

( * ) Notice: Subject to any disclaimer, the term of this patent is extended or adjusted under 35 U.S.C. 154(b) by 565 days.

(21) Appl. No.: 12/608,847

(22) Filed: Oct. 29, 2009

(65) Prior Publication Data
US 2010/0234082 A1    Sep. 16, 2010

(30) Foreign Application Priority Data
Mar. 16, 2009    (KR) .......................... 10-2009-0022050

(51) Int. Cl.
*H04M 1/00*    (2006.01)
(52) U.S. Cl.
USPC ..................................... 455/575.7; 455/550.1
(58) Field of Classification Search ............... 455/575.1, 455/575.5, 575.7, 571.1, 575.3, 550.1, 347, 455/41.1, 421; 370/272, 338, 276
See application file for complete search history.

(56) References Cited

U.S. PATENT DOCUMENTS

| | | | |
|---|---|---|---|
| 6,396,444 B1 * | 5/2002 | Goward et al. | 343/702 |
| 6,830,716 B2 | 12/2004 | Daihisa et al. | |
| 8,027,735 B1 * | 9/2011 | Tziviskos et al. | 607/57 |
| 2002/0093457 A1 | 7/2002 | Hamada et al. | |
| 2005/0046080 A1 * | 3/2005 | Daihisa et al. | 264/275 |
| 2009/0051616 A1 | 2/2009 | Hong et al. | |

FOREIGN PATENT DOCUMENTS

| | | |
|---|---|---|
| CN | 1336020 | 2/2002 |
| JP | 4-373204 A | 12/1992 |
| JP | 05-192964 A | 8/1993 |
| JP | 2000-61981 A | 2/2000 |
| JP | 2002280821 | 9/2002 |

(Continued)

OTHER PUBLICATIONS

Japanese Office Action issued Nov. 1, 2011 in corresponding Japanese Patent Application No. 2010-058111.
Chinese Office Action for Application No. 200910208367.1 mailed May 21, 2012.
Japanese Office Action for Application No. 2010-058111 mailed May 22, 2012.

(Continued)

*Primary Examiner* — Michael Faragalla
(74) *Attorney, Agent, or Firm* — Lowe Hauptman Ham & Berner, LLP

(57) ABSTRACT

A method of manufacturing a case for a mobile communications terminal, includes disposing an antenna pattern inside a mold having a shape of a case for a mobile communications terminal, the mold including one or more magnets, and injecting a molding material into the mold and molding a case for a mobile communications terminal in which the antenna pattern is embedded. The antenna pattern is fixed by a magnetic force of the one or more magnets formed within the mold, and prevented from being deformed or moved while the molding material is injected.

14 Claims, 3 Drawing Sheets

FOREIGN PATENT DOCUMENTS

| | | |
|---|---|---|
| JP | 2009-49992 A | 3/2009 |
| KR | 1020090006817 A | 1/2009 |
| WO | 0039883 | 7/2000 |
| WO | 2007-138161 A1 | 12/2007 |

OTHER PUBLICATIONS

Chinese Office Action in Application No. 200910208367.1 mailed Nov. 26, 2012.

* cited by examiner

METHOD OF MANUFACTURING CASE FOR MOBILE COMMUNICATIONS TERMINAL, CASE FOR MOBILE COMMUNICATIONS TERMINAL, AND MOBILE COMMUNICATIONS TERMINAL HAVING THE SAME

CROSS-REFERENCE TO RELATED APPLICATIONS

This application claims the priority of Korean Patent Application No. 10-2009-0022050 filed on Mar. 16, 2009, in the Korean Intellectual Property Office, the disclosure of which is incorporated herein by reference.

BACKGROUND OF THE INVENTION

1. Field of the Invention

The present invention relates to a method of manufacturing a case for a mobile communications terminal, a case for a mobile communications terminal, and a mobile communications terminal having the same, and more particularly, to a method of manufacturing a case for a mobile communications terminal, by which an antenna pattern is embedded within a terminal case using an injection-molding process, a case for a mobile communications terminal, and a mobile communications terminal.

2. Description of the Related Art

Mobile communications terminals, such as cellular phones, personal digital assistants (PDAs) and notebook computers, are playing an increasingly important role in modern society. Recently, terminals with a variety of functions and designs have emerged due to the fast growing market for portable wireless terminals that separately or commonly use multiple bands, such as CDMA, PDA, DCS and GSM. In addition, the terminals are required to be further diversified in function while becoming smaller, slimmer and lighter. Therefore, techniques for reducing terminal volume while retaining antenna functions are currently in the spotlight.

As for antenna devices, rod antennas or helical antennas that protrude outside terminals are advantageous in terms of their omnidirectional radiation; however, they are susceptible to damage when dropped, thereby undermining device portability. Therefore, studies are being conducted on in-mold antennas that are integrated into the cases of mobile communications terminals.

SUMMARY OF THE INVENTION

An aspect of the present invention provides a method of manufacturing a case for a mobile communications terminal, by which an antenna pattern is embedded in a terminal case, a case for a mobile communications terminal, and a mobile communications terminal having the same.

According to an aspect of the present invention, there is provided a method of manufacturing a case for a mobile communications terminal, the method including: disposing an antenna pattern inside a mold having a shape of a case for a mobile communications terminal, the mold including one or more magnets; and injecting a molding material into the mold and molding a case for a mobile communications terminal in which the antenna pattern is embedded. The antenna pattern is fixed by a magnetic force of the one or more magnets disposed within the mold, and prevented from being deformed or moved while the molding material is injected.

The antenna pattern may be formed into a flat type, and may be a pressed metallic member.

The antenna pattern may be formed into a flat type, and have a three-dimensional shape.

The one or more magnets may be disposed above or under the antenna pattern disposed inside the mold.

The antenna pattern may be formed into a flat type, and include an interconnection pin extending from one surface of the antenna pattern. The molding of the case may be performed to expose one open end of the interconnection pin to one surface of the case for the mobile communications terminal.

According to another aspect of the present invention, there is provided a case for a mobile communications terminal, manufactured according to the method of manufacturing a case for a mobile communications terminal.

According to another aspect of the present invention, there is provided a mobile communications terminal manufactured according to the method of manufacturing a case for a mobile communications terminal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1A:
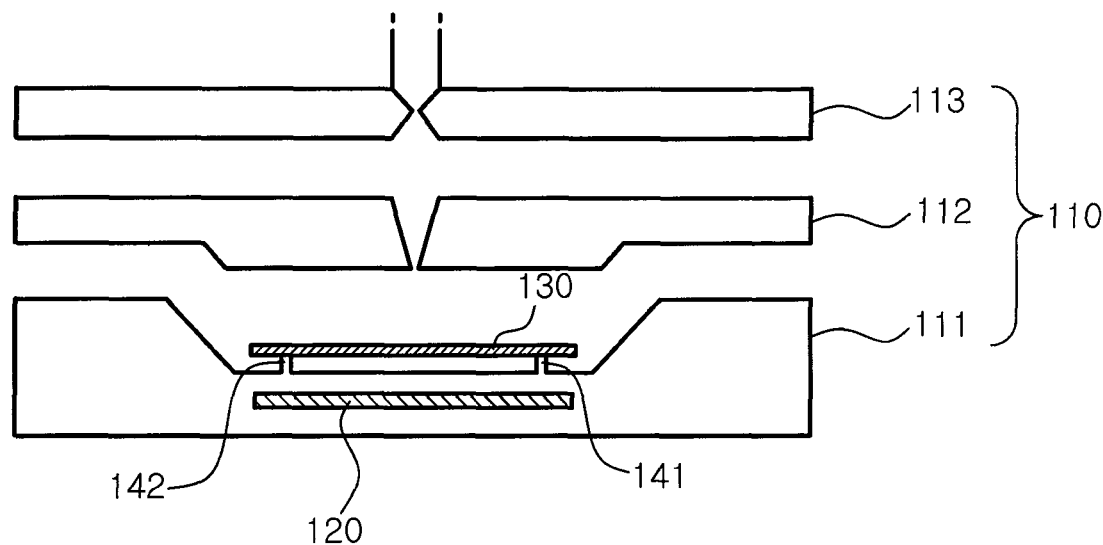
FIGS. 1A and 1B are views for illustrating a method of manufacturing a case for a mobile communications terminal according to an exemplary embodiment of the present invention.
Figure 1B:
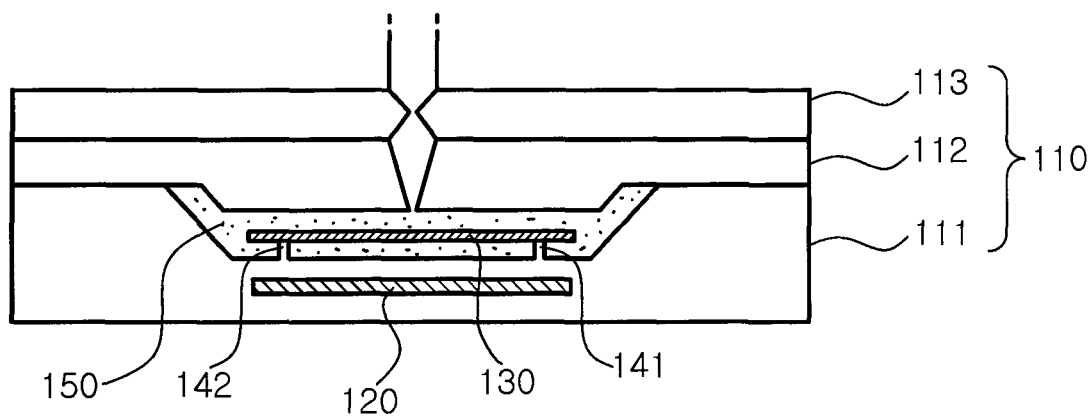

FIGS. 1A and 1B are views illustrating a method of manufacturing a case for a mobile communications terminal (hereinafter, also referred to as a terminal case) according to an exemplary embodiment of the present invention.

Referring to FIGS. 1A and 1B, the method of manufacturing a case for a mobile communications terminal according to this embodiment may include disposing an antenna pattern inside a mold (FIG. 1A); and injecting a molding material into the mold and molding a terminal case (FIG. 1B).

FIG. 1A illustrates the process of inserting a flat antenna pattern 130 into a mold 110. The mold 110 may include a first part 111 constituting the lower part of the mold 110, a second part 112 through which a molding material is injected, and constituting the upper part of the mold 110, and a third part 113 connected to a molding-material storage unit through a nozzle.

The flat antenna pattern 130 may be an antenna pattern formed by performing press-processing on a flat metallic plate. The use of such a pressed metallic member may facilitate the production of an antenna pattern since an excessively thin flat plate is unnecessary. The thickness of the antenna pattern 130 only needs to be smaller than that of the terminal case. Thus, a flat metallic plate used in the related art may be used to form the flat antenna pattern 130. The flat antenna pattern 130 may be implemented in various forms realizing antenna characteristics, provided that it has a thickness sufficient to allow for the embedding thereof into a terminal case according to this embodiment.

The flat antenna pattern 130 may be formed into a three-dimensional shape. In this embodiment, the antenna pattern may be implemented by being inserted into a case for a mobile communications terminal. Accordingly, the flat antenna pattern may be formed into a three-dimensional shape according to the curves or the like of the terminal case. In this way, the process of manufacturing the mobile communications terminal can be performed.

In this process, the flat antenna pattern 130 may be inserted between the first part 111 and the second part 112 of the mold 110. The flat antenna pattern 130 may be fixed by protrusions 141 and 142 formed on the mold 110. In this embodiment, the protrusions 141 and 142 maybe inserted to holes formed in the antenna pattern 130, respectively.

According to this embodiment, a magnet 120 may be disposed within the mold 110. The magnet 120 may fix the antenna pattern 130, inserted into the mold 110, with its magnetic force. The protrusions 141 and 142 formed on the mold 110 may serve to prevent the horizontal motion of the antenna pattern 130, while the magnet 120 serves to prevent the vertical motion of the antenna pattern 130.

FIG. 1B illustrates the process of injecting a molding material into the mold 110 and molding the terminal case.

In this process, in the state in which all the parts of the mold 110 are joined together and fixed under constant pressure, a molding material may be injected into the space of the mold 110 through a nozzle under constant pressure. The molding material may be a polymer-based material for forming a terminal case. After the space between the second part 112 and the first part 111 of the mold 110 is filled with the molding material injected into the mold 110, the mold 110 may be maintained under constant pressure.

When the molding material is injected into the mold 110, if the antenna pattern 130, disposed inside the mold 110, moves vertically or horizontally or deforms due to the fluidity of the molding material, this may impair antenna characteristics. In this embodiment, the horizontal motion of the antenna pattern 130 can be prevented due to the protrusions 141 and 142 inside the mold 110. Furthermore, since the magnet 120, disposed within the mold 110, fixes the antenna pattern 130 with its magnetic force, the antenna pattern 130 can be prevented from being deformed as it is pushed by the molding material.

The molding material, after being injected into the mold 110, is cooled down, cured (hardened) and processed, thereby forming a case 150 for a mobile communications terminal, into which the antenna pattern 130 is embedded.

As described above, according to this embodiment, the injection-molding process is used to form the antenna pattern within the case for a mobile communications terminal, and the magnet is formed within the mold to thereby prevent the motion or deformation of the antenna pattern.

Figure 2A:
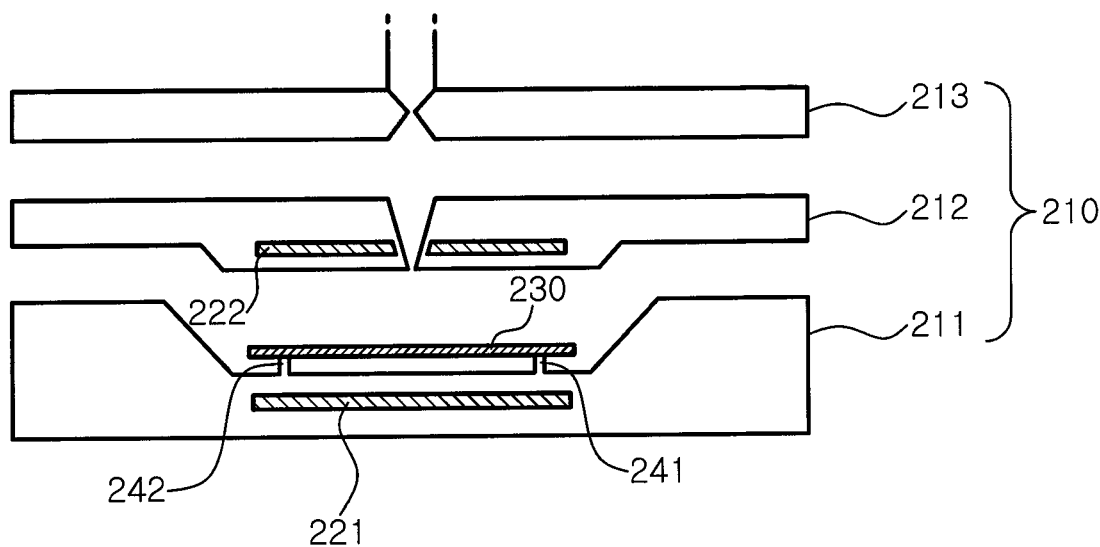
FIGS. 2A and 2B are views for illustrating a method of manufacturing a case for a mobile communications terminal according to another exemplary embodiment of the present invention.
Figure 2B:
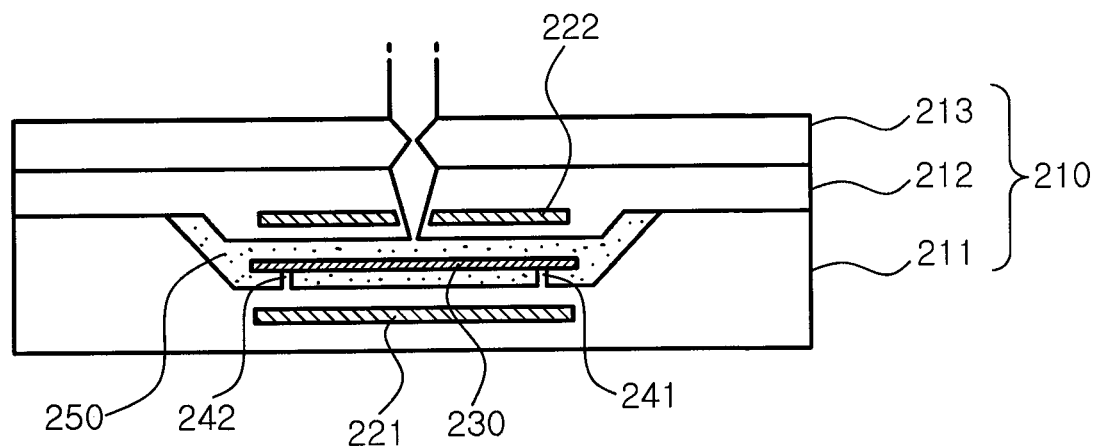

FIGS. 2A and 2B are views illustrating of a method of manufacturing a case for a mobile communications terminal according to an exemplary embodiment of the present invention.

Referring to FIGS. 2A and 2B, the method of manufacturing a mobile communications terminal according to this embodiment, may include disposing an antenna pattern inside a mold (FIG. 2A), and injecting a molding material into the mold and molding a terminal case (FIG. 2B).

FIG. 2A illustrates the process of inserting an antenna pattern 230 into a mold 210. The mold 210 may include a first part 211 constituting the lower part of the mold 210, a second part 212 through which a molding material is injected, and constituting the upper part of the mold 210, and a third part 213 connected to a molding-material storage unit through a nozzle.

The flat antenna pattern 230 may be an antenna pattern formed by performing press-processing on a flat metallic plate. The use of such a pressed metallic member may facilitate the production of an antenna pattern since an excessively thin flat plate is unnecessary. In this embodiment, the thickness of the antenna pattern 230 only needs to be smaller than that of the terminal case. Thus, a flat metallic plate used in the related art may be used to form the flat antenna pattern 230. The flat antenna pattern 230 may be implemented in various forms realizing antenna characteristics, provided that it has a thickness allowing for the embedding thereof into the terminal case according to this embodiment.

In this process, the flat antenna pattern 230 may be inserted between the first part 211 and the second part 212 of the mold 210. The flat antenna pattern 230 may be fixed by protrusions 241 and 242 formed in the mold 210. In this embodiment, the protrusions 241 and 242 may be inserted into holes formed in the antenna pattern 230.

Magnets 221 and 222 may be disposed within the mold 210 used in this embodiment. The magnets 221 and 222 may fix the antenna pattern 230 inserted into the mold 210 with their magnetic force. In this embodiment, since the magnets 221 and 222 are respectively disposed under and above the antenna pattern 230 inserted into the mold 210, the magnetic force of the first and second magnets 221 and 222 is applied to the antenna pattern 230, thereby fixing the antenna pattern 230.

The protrusions 241 and 242 formed in the mold 210 may serve to prevent the horizontal motion of the antenna pattern 230, while the magnets 221 and 222 may serve to prevent the vertical motion of the antenna pattern 230.

FIG. 2B illustrates the process of injecting a molding material into the mold 210 and molding a terminal case.

In this process, in the state in which all the parts of the mold 210 are joined together and fixed under constant pressure, a molding material may be injected into the space of the mold 210 through a nozzle under constant pressure. The molding material may be a polymer-based material for forming a terminal case. After the space between the second part 212 and the first part 211 of the mold 210 is filled with the molding material injected into the mold 210, the mold 210 may be maintained under constant pressure.

When the molding material is injected into the mold 210, if the antenna pattern 230 disposed inside the mold 210 moves vertically or horizontally or deforms due to the fluidity of the molding material, this may impair antenna characteristics. In this embodiment, the horizontal motion of the antenna pattern 230 can be prevented due to the protrusions 241 and 242 inside the mold 210. Furthermore, since the magnets 221 and 222, disposed within the mold 210, fixes the antenna pattern 230 with its magnetic force, the antenna pattern 230 can be prevented from being deformed as it is pushed by the molding material.

The molding material, after being injected into the mold 210, is cooled down, cured (hardened) and processed, thereby forming a case 250 for a mobile communications terminal, into which the antenna pattern 230 is embedded.

As described above, according to this embodiment, the first and second magnets for fixing the antenna pattern are disposed under and above the antenna pattern, within the mold 210 used to form a case for a mobile communications terminal into which the antenna pattern is embedded. This prevents the motion or deformation of the antenna pattern at the time of molding.

Figure 3A:
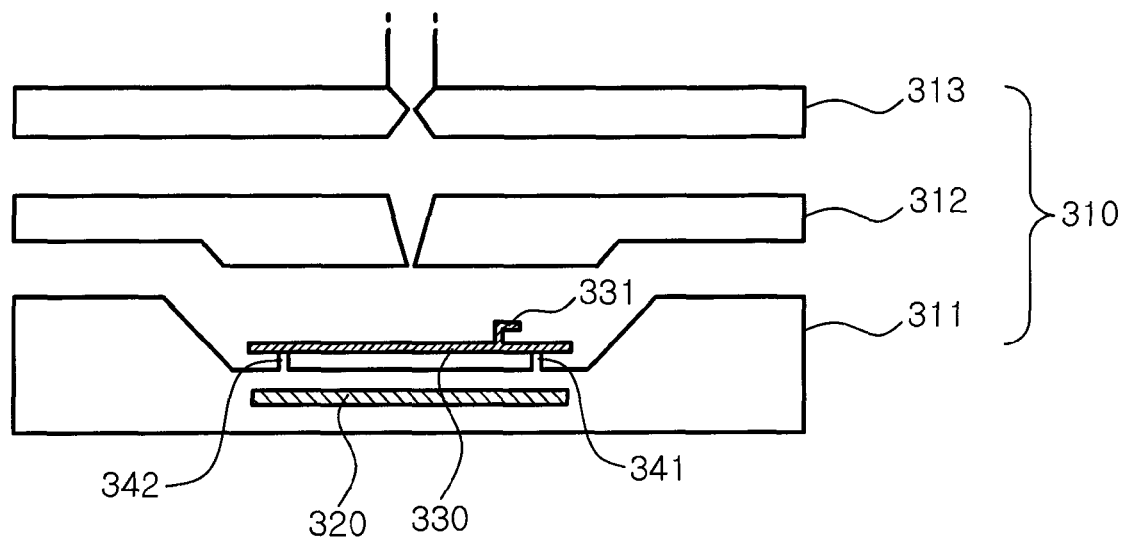
FIGS. 3A and 3B are views for illustrating a method of manufacturing a case for a mobile communications terminal according to another exemplary embodiment of the present invention.
Figure 3B:
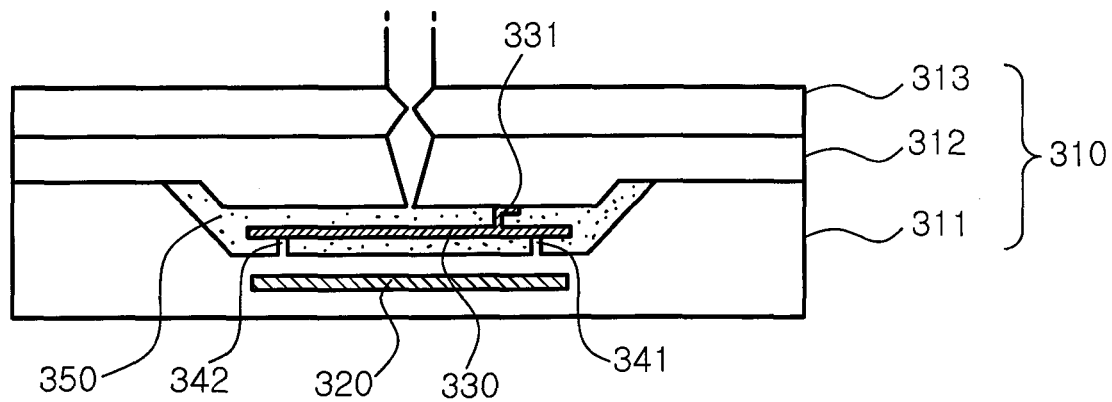

FIGS. 3A and 3B are views illustrating of a method of manufacturing a case for a mobile communications terminal according to another exemplary embodiment of the present invention.

Referring to FIGS. 3A and 3B, the method of manufacturing a case for a mobile communications terminal according to this embodiment, may include disposing an antenna pattern inside a mold (FIG. 3A), and injecting a molding material into a mold and molding a terminal case (FIG. 3B).

FIG. 3A illustrates the process of inserting a flat antenna pattern 330 into a mold 310. The mold 310 may include a first part 311 constituting the lower part of the mold 310, a second part 312 through which a molding material is injected, and constituting the upper part of the mold 310, and a third part 313 connected to a molding-material storage unit through a nozzle.

The flat antenna pattern 330 may be an antenna pattern formed by performing press-processing on a flat metallic plate. The use of such a pressed metallic member may facilitate the production of an antenna pattern since an excessively thin flat plate is unnecessary. In this embodiment, the thickness of the antenna pattern 330 only needs to be smaller than that of the terminal case. Thus, a flat metallic plate used in the related art may be used to form the flat antenna pattern 330. The flat antenna pattern 330 may be implemented in various forms realizing antenna characteristics, provided that it has a thickness allowing for the embedding thereof into the terminal case according to this embodiment.

In this process, the flat antenna pattern 330 may be inserted between the first part 311 and the second part 312 of the mold 310. The flat antenna pattern 330 may be fixed by protrusions 341 and 342 formed in the mold 310. In this embodiment, the protrusions 341 and 342 may be inserted into holes formed in the antenna pattern 330.

According to this embodiment, the antenna pattern 330 may include an interconnection pin 331 extending from one surface of the antenna pattern 330. The interconnection pin 331 may be used for an electrical connection between a board disposed inside a body of a mobile communications terminal and the antenna pattern embedded within the terminal case.

A magnet 320 may be disposed within the mold 310 used in this embodiment. The magnet 320 may fix the antenna pattern 330 inserted into the mold 310 with its magnetic force. The protrusions 341 and 342 formed in the mold 310 may serve to prevent the horizontal motion of the antenna pattern 330, while the magnet 320 serves to prevent the vertical motion of the antenna pattern 330.

FIG. 3B illustrates the process of molding a terminal case by joining all the parts of the mold 310 together and injecting a molding material thereinto.

In this process, in the state in which all the parts of the mold 310 are joined and fixed under constant pressure, a molding material may be injected into the space of the mold 310 through a nozzle under constant pressure. The molding material may be a polymer-based material for forming a terminal case. After the space between the second part 312 and the first part 311 of the mold 310 is filled with the molding material injected into the mold 310, the mold 310 may be maintained under constant pressure.

When the molding material is injected into the mold 310, if the antenna pattern 330, disposed inside the mold 310, moves vertically or horizontally or deforms due to the fluidity of the molding material, this may impair antenna characteristics. In this embodiment, the horizontal motion of the antenna pattern 330 can be prevented due to the protrusions 341 and 342 inside the mold 310. Furthermore, since the magnet 320, disposed within the mold 310, fixes the antenna pattern 330 with its magnetic force, the antenna pattern 330 can be prevented from being deformed as it is pushed by the molding material.

In the injection-molding process of this embodiment, one open end of the interconnection pin 331 extending from the antenna pattern 330 maybe exposed to one surface of a terminal case 350.

The molding material, after being injected into the mold 310, is cooled down, cured (hardened) and processed, thereby forming the terminal case 350 for a mobile communications terminal, into which the antenna pattern 330 is embedded.

As described above, according to this embodiment, the antenna pattern including the interconnection pin can be embedded within the terminal case using the injection-molding process. Accordingly, an additional space for the antenna pattern can be reduced, thereby contributing to reducing the size of a mobile communications terminal. Furthermore, since the antenna pattern is fixed by the magnet during the injection-molding process, the deformation of the antenna pattern can be prevented.

As set forth above, according to exemplary embodiments of the invention, the antenna pattern can be embedded within a case for a mobile communications terminal, which is advantageous in miniaturization and the prevention of the deformation or motion of the antenna pattern during the injection-molding process.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing a case for a mobile communications terminal, the method comprising:
disposing an antenna pattern inside a mold having a shape of the case, the mold including at least one protrusion for supporting the antenna pattern and at least one magnet;
injecting a molding material into the mold; and
molding the case with the antenna pattern embedded in the molding material, wherein
the disposing includes
fixing the antenna pattern in a first direction by the at least one protrusion, and
fixing the antenna pattern in a second direction perpendicular to the first direction by a magnetic force of the at least one magnet,
the antenna pattern is fixed by a magnetic force of the at least one magnet disposed within the mold and is prevented from being deformed or moved while the molding material is injected,
the antenna pattern is flat and includes an interconnection pin extending from one surface of the antenna pattern, and
the molding includes exposing one end of the interconnection pin onto one surface of the case.

2. The method of claim 1, wherein the antenna pattern is a flat pressed metallic member.

3. The method of claim 1, wherein the antenna pattern is flat and has a shape curved along a shape of the mold.

4. The method of claim 1, wherein the at least one magnet is disposed above or under the antenna pattern disposed inside the mold.

5. A case for a mobile communications terminal, the case comprising:
- a molded body of a molding material; and
- an antenna pattern embedded in the molding material, wherein
- the body includes at least one recessed portion,
- the at least one recessed portion is formed to reach the antenna pattern,
- the case is manufactured by a method comprising:
    - disposing the antenna pattern inside a mold having a shape of the case, the mold including at least one protrusion for supporting the antenna pattern and at least one magnet;
    - injecting the molding material into the mold; and
    - molding the case with the antenna pattern embedded in the molding material, wherein
    - the disposing includes
        - fixing the antenna pattern in a first direction by the at least one protrusion, and
        - fixing the antenna pattern in a second direction perpendicular to the first direction by a magnetic force of the at least one magnet, and
    - the antenna pattern is fixed by a magnetic force of the at least one magnet disposed within the mold and is prevented from being deformed or moved while the molding material is injected,
- the antenna pattern is flat and includes an interconnection pin extending from one surface of the antenna pattern, and
- the molding includes exposing one end of the interconnection pin onto one surface of the case.

6. A mobile communications terminal, comprising:
- a case including
    - a molded body of a molding material, and
    - an antenna pattern embedded in the molding material, wherein the body includes at least one recessed portion,
- the at least one recessed portion is formed to reach the antenna pattern,
- the case is manufactured by a method comprising:
    - disposing the antenna pattern inside a mold having a shape of the case, the mold including at least one protrusion for supporting the antenna pattern and at least one magnet;
    - injecting the molding material into the mold; and
    - molding the case with the antenna pattern embedded in the molding material, wherein
    - the disposing includes
        - fixing the antenna pattern in a first direction by the at least one protrusion, and
        - fixing the antenna pattern in a second direction perpendicular to the first direction by a magnetic force of the at least one magnet, and
    - the antenna pattern is fixed by a magnetic force of the at least one magnet disposed within the mold and is prevented from being deformed or moved while the molding material is injected,
- the antenna pattern is flat and includes an interconnection pin extending from one surface of the antenna pattern, and
- the molding includes exposing one end of the interconnection pin onto one surface of the case.

7. The method of claim 1, wherein the at least one magnet comprises magnets disposed both above and under the antenna pattern disposed inside the mold.

8. The method of claim 1, wherein
- the antenna pattern includes at least one groove at portions corresponding to the at least one protrusion, and
- the disposing includes fitting the at least one protrusion into the at least one groove.

9. The case of claim 5, wherein the antenna pattern is a flat pressed metallic member.

10. The case of claim 5, wherein the antenna pattern is flat and has a shape curved along a shape of the mold.

11. The case of claim 5, wherein the antenna pattern includes at least one groove corresponding to the at least one recessed portion.

12. The mobile communications terminal of claim 6, wherein the antenna pattern is a flat pressed metallic member.

13. The mobile communications terminal of claim 6, wherein the antenna pattern is flat and has a shape curved along a shape of the mold.

14. The mobile communications terminal of claim 6, wherein the antenna pattern includes at least one groove corresponding to the at least one recessed portion.

* * * * *